United States Patent [19]

Buchanan

[11] Patent Number: 5,622,864

[45] Date of Patent: Apr. 22, 1997

[54] APPARATUS FOR REMEDIATING CONTAMINATED SOIL CONTAINING ORGANIC COMPOUNDS

[76] Inventor: Alan B. Buchanan, P.O. Box 1672, Canyon Lake, Tex. 78130

[21] Appl. No.: 511,705

[22] Filed: Aug. 4, 1995

Related U.S. Application Data

[62] Division of Ser. No. 143,439, Oct. 26, 1993, Pat. No. 5,563,066.

[51] Int. Cl.$^6$ .................................................... C12M 1/00
[52] U.S. Cl. ...................... 435/290.1; 134/111; 405/128; 435/290.2
[58] Field of Search .............................. 435/290.1, 290.2, 435/262, 264; 405/128; 210/611; 52/169.4, 169.7, 264; 256/25, 26; 134/111

[56] References Cited

U.S. PATENT DOCUMENTS

| | | |
|---|---|---|
| 3,148,752 | 9/1964 | Lesage ........................................ 52/264 |
| 4,336,136 | 6/1982 | Giguerre . | |
| 4,727,031 | 2/1988 | Brown et al. . | |
| 4,749,491 | 6/1988 | Lawes et al. . | |
| 4,822,490 | 4/1989 | Dyadechko et al. . | |
| 4,841,998 | 6/1989 | Bruya . | |
| 4,849,360 | 7/1989 | Norris et al. ............................ 405/128 |
| 4,906,302 | 3/1990 | Bruya . | |
| 5,035,537 | 7/1991 | Rose . | |
| 5,039,415 | 8/1991 | Smith ...................................... 210/611 |
| 5,055,196 | 10/1991 | Darian et al. . | |
| 5,115,986 | 5/1992 | Bateson et al. . | |
| 5,126,073 | 6/1992 | Saab . | |
| 5,178,491 | 1/1993 | Graves et al. .......................... 405/128 |

Primary Examiner—George Yeung
Attorney, Agent, or Firm—Cox & Smith Incorporated

[57] ABSTRACT

A method and apparatus for remediating contaminated soil containing organic compounds, wherein, a sectional, portable, and sealable container is assembled at a site for remediation. Contaminated soil for remediation is disposed within the container and covered by a pool of recirculating water carrying selected biological elements and chemicals to effect the remediation process. Hydrocarbon elements released from the contaminated soil rise to the surface of the pool and are collected by skimming for recovery.

9 Claims, 10 Drawing Sheets

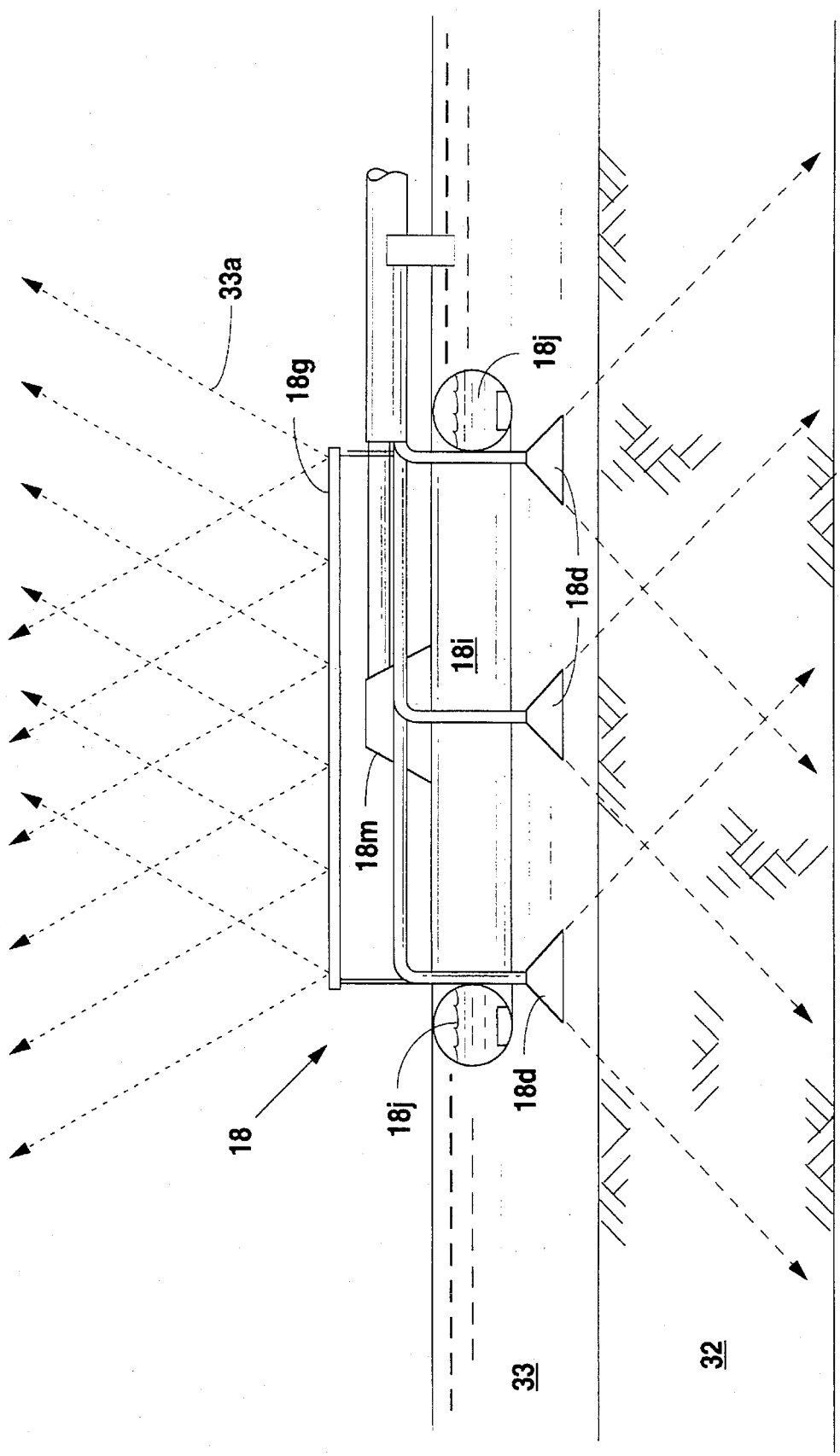

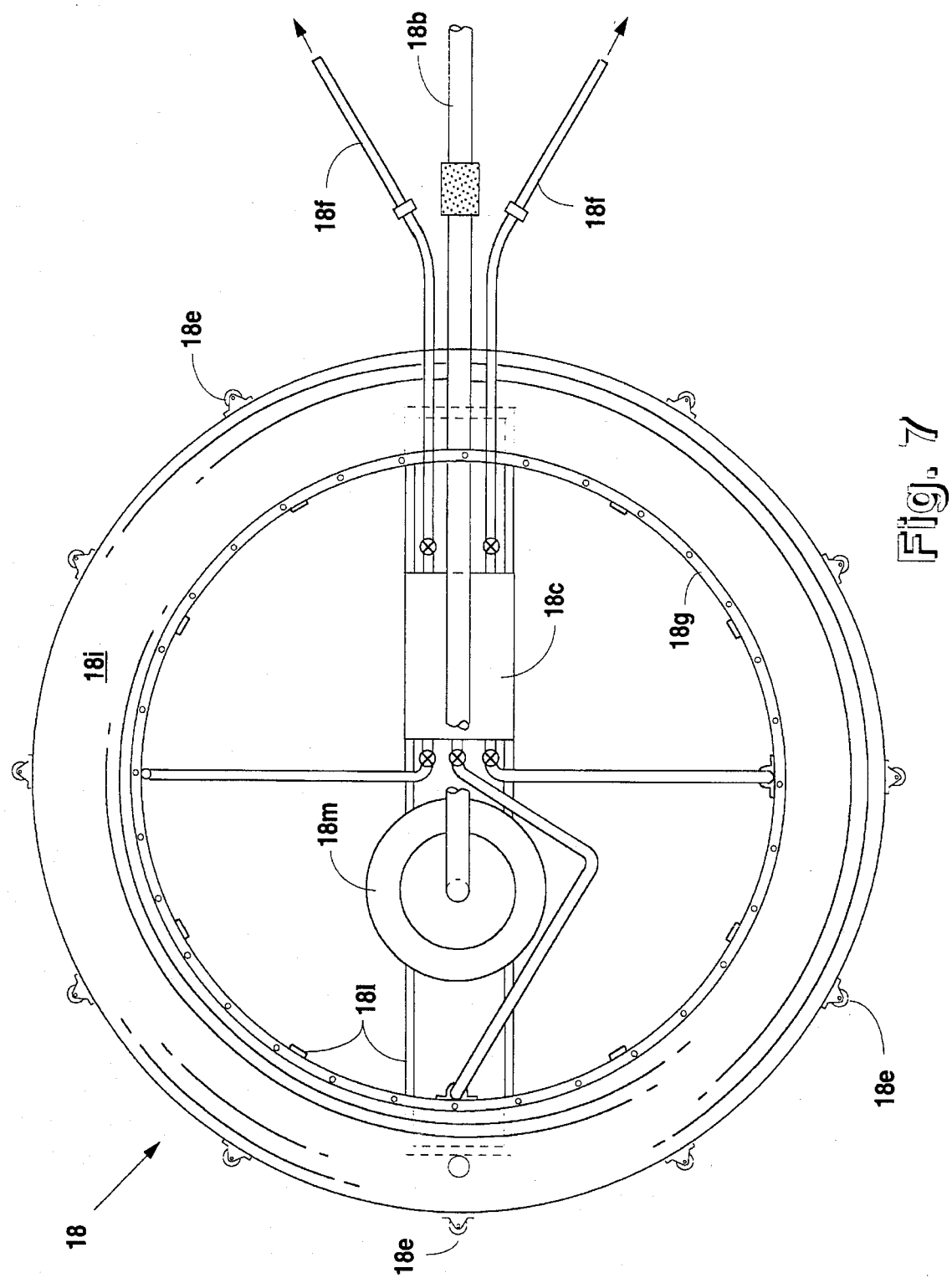

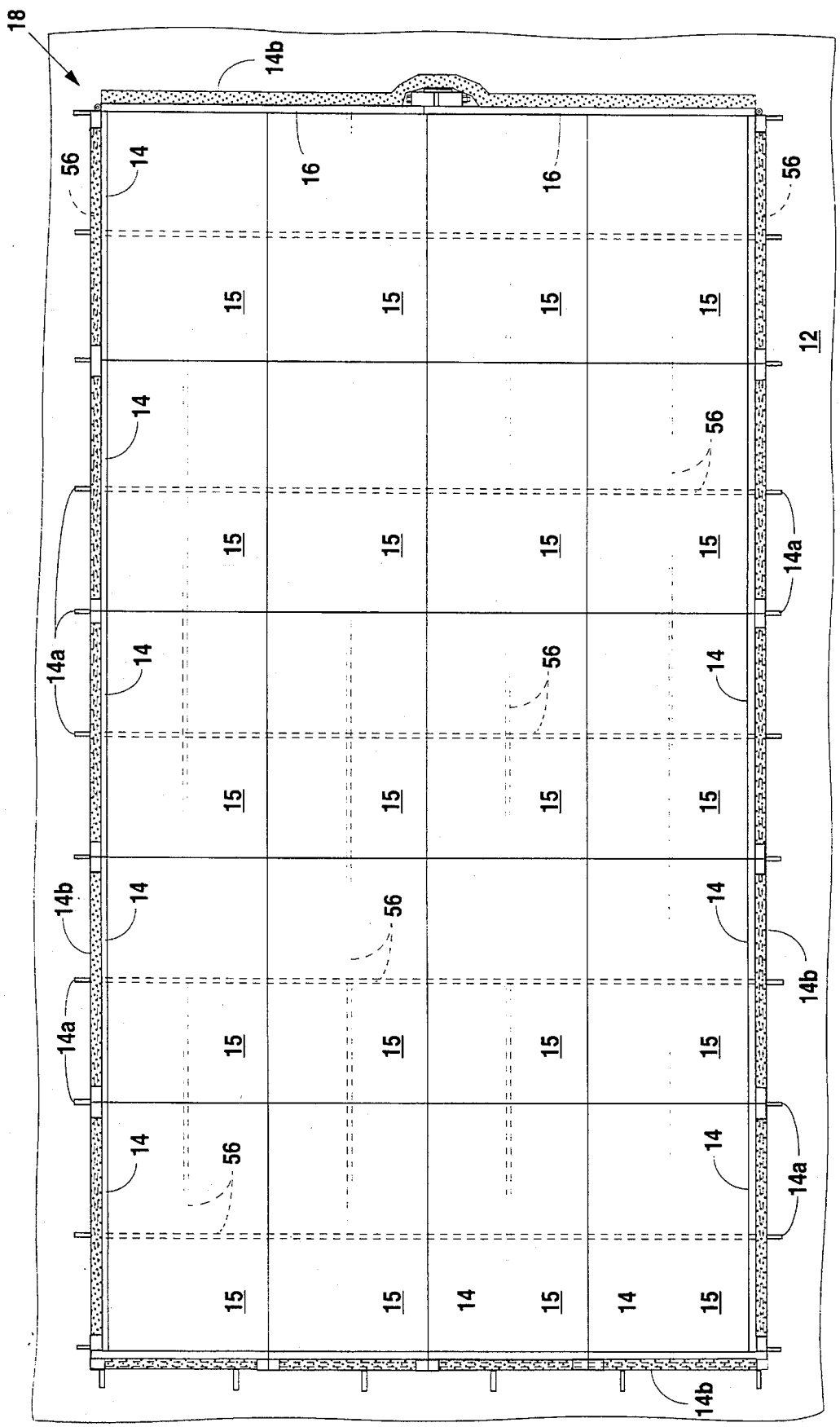

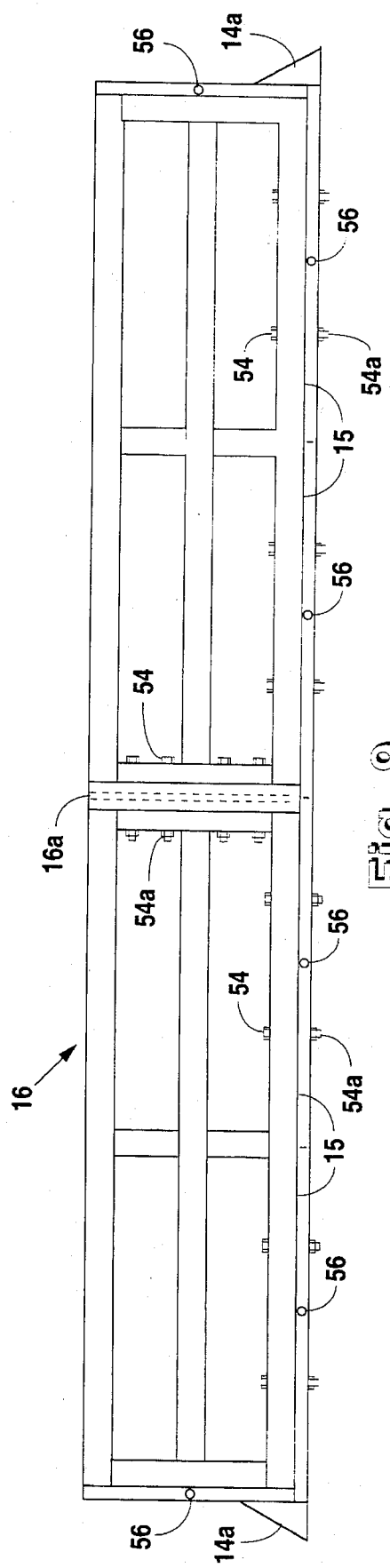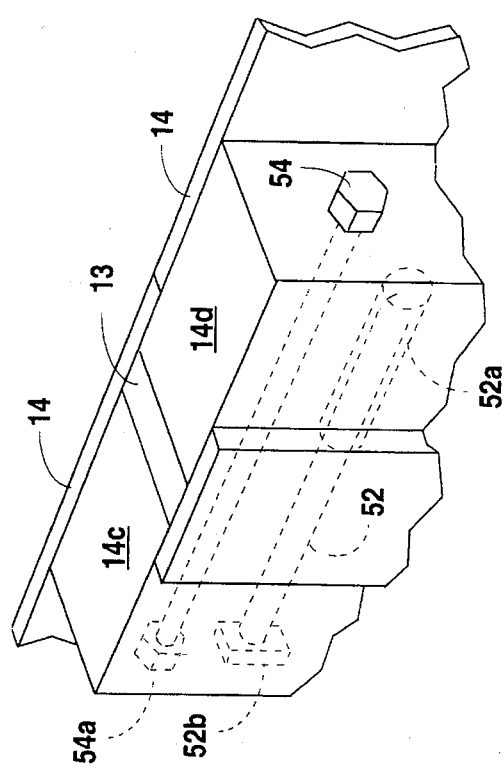

APPARATUS FOR REMEDIATING CONTAMINATED SOIL CONTAINING ORGANIC COMPOUNDS

This is a divisional of application Ser. No. 08/143,439, filed Oct. 26, 1993, now U.S. Pat. No. 5,563,066.

FIELD OF THE INVENTION

The present invention relates in general to a system for remediation of contaminated soil containing organic compounds. In particular, the present invention relates to bio-remediation of contaminated soil containing carbon based compounds. In even greater particularity the present invention relates to a system for combining biological elements, chemicals, mechanical apparatus and methods for separating and recovery of hydrocarbons from contaminated soil.

BACKGROUND OF THE INVENTION

Bio-remediation is an increasingly popular approach for treatment of soils such as silt, clay, crushed porous type rock, and the like that has been contaminated with organic compounds. For example, bio-remediation has been employed in the treatment of subsurface soils contaminated by hydrocarbons as in the case of leaking underground tanks, pits or pipes. Bio-remediation has also been used in the treatment of water-borne off and gas contamination such as in tanker mishaps, soil accumulated on drilling platforms, pipeline leaks and the like.

While the utilization of bacterial microorganisms for remediation has enjoyed some success, there are problems with implementation of various bio-remediation methods that have been proposed. A particular problem is that bio-remediation methods tend to be somewhat inefficient and time-consuming and require treatment of contaminated soil in relatively small batches. The treatment of such contaminated soil has been actively featured in recently issued patents. Note for example, U.S. Pat. No. 5,039,415 to Smith, and U.S. Pat. No. 4,849,360 to Norris. The apparatuses heretofore employed for such soil decontamination generally have a limited treatment capacity measured in terms of less than 50 cubic yards of contaminated soil per batch. Weeks or months are often required for the microbes to bio-remediate the soil, particularly when the ambient temperature falls below 50° F. Where large quantities of contaminated soil exist, it has been disclosed in U.S. Pat. No. 5,178,491 to Graves, et al. to dig a trench in the vicinity of the contaminated soil or to install a concrete bunker and treat large quantifies of soil in such structures. Such trenches and bunkers are of a permanent nature, costly to produce and can only be utilized for treatment of contaminated soil located within a reasonable transport distance.

A problem that is common to a broad range of industries is soil areas that have been contaminated with diesel, gasoline, lubricating oils, and various other petroleum hydrocarbons used in vehicle operation or in maintenance procedures. Those hydrocarbon contaminated areas are typically found in maintenance yards, equipment cleaning areas, fuel and lubricant storage areas, refueling areas, and around tank terminal operations. Often those areas cannot be closed while the soil is excavated, removed to another location, treated, and then replaced in the same location. The present invention does not require the closure of the contaminated area to bio-remediate the contaminated soil areas.

Historically, the common tendency of industry has been largely to ignore these contaminated areas and just accept them as a part of normal operations. However, with the advent of a much greater level of environmental awareness by the public and pressures coming to bear from regulatory authorities, such as the Environmental Protection Agency, many industries are beginning to search for an economic, efficient method of addressing this problem.

A number of alternatives are available for handling hydrocarbon contaminated soils. The traditional solution has been to dig up the contaminated soil and send it to a waste disposal firm. This solution tends to be relatively expensive. The cost to handle the contaminated soils ranges from $200 up to $1,000 per yard of soil depending upon the area of the country in which the disposal is being done.

As an alternative to these traditional approaches, a new technology has emerged to address this problem. This technology is the cleanup of the soil on site using a balanced bio-remediation approach. The balanced approach involves excavating the contaminated soil and biologically, chemical, thermally, and mechanically treating the soil. The final step in the balanced approach is returning the once contaminated soil to its place of origin containing natural nutrients capable of starting and sustaining vegetation. In fact, contaminated soil processed by the present invention, utilizing a balanced approach may be removed from the contamination site, remediated, then deposited in a third site that requires uncontaminated soil.

Most soil and water contain significant populations of microscopic one celled organisms that have the capacity to break down and decompose plant and animal waste. Functionally, these microscopic organisms utilize the waste organic compound as a food source and degrade the organic compound to create carbon dioxide, water, fatty acids, and cell mass. It is by this process that leaves, dead vegetation, and other organic materials are converted into humus that makes up the organic portion of the soil. There are also many natural organisms that have the ability to utilize diesel-fuel, kerosene, gasoline lubricating oils, and other petroleum hydrocarbons as a food source. There are also organisms which are specifically genetically engineered to be able to use such petroleum hydrocarbons as a food source, thus breaking these hydrocarbons down into smaller components which are more easily digested by indigenous natural organisms already existing in the soil. However, microbes are only part of the solution to bio-remediation of contaminated areas. The breaking apart and emulsifying the soil is necessary for providing a vehicle for the microbes to reach the emulsified soil to begin the remediation process.

Accordingly, the present invention is a balanced system to remediate contaminated soil and recover hydrocarbons that is economical, time efficient, portable and easy to implement. The total balanced approach to remediating soil is uniquely intra-woven into the method and apparatus of the claimed invention.

SUMMARY OF THE INVENTION

The present invention is a method and apparatus for remediating soil contaminated by organic compounds. Soil shall be defined herein as any freely divided, rock derived, and fine grained material, such as clay, silt, sand, rock, porous rock, shale, or any other material that is naturally deposited upon the earth. The claimed invention does not rely on pre-testing the soil for a pH factor or rely on the separating, grading, and selection of soil particles according to size prior to treatment by the claimed method and apparatus. Soil from various contaminated sites may be combined and remediated by the batch process of the claimed method utilizing the claimed apparatus and then returned to its original excavated site or any other site.

The apparatus of the present invention is a portable, box-like, open top container preferably of a size suitable for entry by contaminated soil carrying vehicles, such as highway trucks, front-end loaders, bulldozers and the like.

The container's floor or principal weight bearing structure comprises an assembly of flat panels mounted on a support structure that supports not only the weight of the soil to be treated in the container but also any type of vehicle transporting the soil from the excavation site to the floor of the container. The container's walls may comprise a plurality of upstanding panel members secured about the perimeter of the floor panel assembly by any conventional means such as nuts and bolts. Both the floor panels and wall panels are light in weight and of a size readily transportable by conventional highway trucks.

The container has at one end a hinged door opening outwardly. The corners, floor seams, and wall seams, are sealed prior to the filing of the container with contaminated soil. The container is preferably assembled on a waterproof flexible plastic sheet that is juxtaposed between the floor panel and any flat surface appropriate for the container. The outwardly facing surface of the upstanding walls may, if desired, be reinforced by retaining braces to provide added support for the container when filled with contaminated soil. After the container is filled with contaminated soil, the doors are dosed and sealed.

The floor members utilize steel panels that have at least one flat surface. The steel panels are affixed to steel beams to provide the necessary support-structure. Those members are assembled to define a substantially rectangular floor for the container atop at least four (4) inches of sand. A plastic sheet is placed beneath the sand to isolate the sand and container from the excavation site. The sand will conform around the support structure providing added support for the container floor. The size of the floor is chosen to handle large batches, at least 100 cubic yards, of contaminated soil removed from the excavation site. In fact, the floor may be any size allowable by the physical and environmental constraints of the site to be remediated. The floor panels are sealable on all sides to accommodate assembly of very large floor structures.

The container's walls may, if desired, be made from the same or different material from those which comprise the floor members. The length, height, and width of the walls are selected to enclose the chosen size and shape of the container's floor. The container walls of the preferred embodiment are a plurality of substantially rectangular upstanding panel members. The entry of the container may be any conventionally mounted door in one of the vertical walls of the container.

The wall panels are held in place by a first plurality of vertically spaced cables positioned along and exterior to the wall's flat surface. Those cables are connected to the opposite corners of the container to impart pre-stressing to the walls by tightening the cable, thereby reinforcing and promoting the sealing of the upstanding wall members. Similarly, the floor panels have a second plurality of cables connecting the opposite edges, both length and width, of the floor and imparting pre-stressing to the floor.

The entry way of the preferred embodiment is a hinged double door mounted in one of the shorter width walls of the rectangular container. The doors open outwardly and, when closed, an elongated rubber seal is inserted between all of the abutting edges of the two doors that are in contact with the wall or floor members, thereby sealing the doors. The joining edges of the wall and floor panels also have elongated rubber seals inserted between the joining edges, thereby sealing the joint of the walls or floor panels.

The method of this invention contemplates assembling a soil treatment container capable of handling batches of soil well in excess of 100 cubic yards by use of small panels. The container has a door through which soil transport vehicles can enter to deposit contaminated soil. The soil is leveled to a substantially uniform depth throughout the container and water containing decontaminating chemicals and bacterial microbes is added to the interior of the container to a depth forming a pool completely covering the contaminated soil and preferably extending at least a foot above the surface of the contaminated soil.

Once the floor and wall members are assembled on the chosen site, a sealing tape is applied to all interior joining edges. The sealing tape provides a liquid tight connection to all interior joining edges.

A recirculation system is provided for the pool water in the container and the recirculating water is pressurized and directed through appropriate nozzle arrangements to spray downwardly into the pool of water over its entire surface, thus agitating not only the water, but the contaminated soil lying thereunder, causing intimate shearing of the soil and penetration of the water containing the treatment agents into the soil. Such agitation and shearing by the recirculating water can be accomplished by a plurality of overlapping spaced fixed nozzles, or by a boom, carried by a truck or trailer positioned adjacent to a sidewall of the box, and horizontally movable so as to cover all portions of the pool of water with the downwardly projecting spray.

The method of this invention can be practiced with any chemicals added to the recirculating pool water that have the capability of breaking down soil masses, and particularly days, into discrete particles to release hydrocarbons adhering thereto to float to the surface of the pool for collection and removal, while at the same time exposing unreleased hydrocarbons or similar organic contaminants to the remediation action of the microbiological agents also carried by the recirculating water.

Suitable chemicals to be added into the recirculating pool water may be a combination of salts selected from the group consisting of ammonium sulfate, ammonium nitrate, ammonium chloride and calcium chloride and at least one wetting agent such as dodecyl benzene sulfonic acid, fatty amide-phosphate ester salt and monoisopropyl amine dodecyl benzene sulfonate. The salts and wetting agent together have the effect of not only breaking down the soil masses into discrete particles but also breaking down masses of hydrocarbon molecules in the soil into individual molecules. In particular, the nitrogen atoms in the salts are particularly effective in breaking down paraffin and heavy oils from larger chain molecules (over 30,000 grams/mole) to smaller chain molecules (below 30,000 grams/mole), so that they can be released out of the soil and into the water blanket. Specifically, the combination of salts and wetting agent in aqueous solution is particularly effective in breaking down tars, paraffins and asphaltenes present in the contaminated soil.

In the preferred embodiment of the invention, a float is placed in the pool carrying downwardly directed nozzles, and connected by flexible hoses to the source of pressurized recirculating water containing the treatment agents. Such float may be movable over the pool surface by small water jets positioned at an angle to the vertical, producing arbitrary movement of the float to cover the entire area of the pool with the downwardly directed aerating agitating jets.

Such float may also incorporate a skimming device for skimming liquid oils that are released from the contaminated soil due to the action of the water carried chemicals on the soil. The skimmed oil and that water which necessarily is picked up in the skimming operation are directed to an oil separating mechanism wherein the skimmed oil is separated from the water to provide an economical byproduct and the water is returned to the recirculation system.

In climates where lower temperatures may be expected, heating elements, preferably comprising diesel or liquid petroleum fired boilers, are utilized to maintain the water temperature in the range of 50° to 115° F., which greatly facilitates the bacterial action of the microbes in converting hydrocarbons into carbon dioxide, fatty acids, and water in the manner that is well known in the art, as described in the aforementioned prior art patents. In the preferred embodiment water is siphoned from the container by the skimming device of the float and a suitably provided sump pump mounted in the medial portion of one of the upstanding walls. All water siphoned from the container and passes through a heat exchanger of any conventional type to impart thermal energy to the water, thereby maintaining the temperature of water in the range of about 50° to 115° F. Additionally, foam insulation may be applied to the exterior surfaces of the container walls to retain that thermal energy within the container.

Lastly, if the analysis of the contaminated soil indicates that volatile vapors may be released from the contaminated soil as a result of the decontaminating treatment, a sheet of plastic may be applied as a roof over the container. In the preferred embodiment, upwardly directed water sprayed from the float or roof will entrap toxic vapors and return them to the pool of water. The air beneath the roof and above the pool of water containing the vapors is circulated through a conventional vapor removing apparatus to insure that no toxic vapors are discharged into the atmosphere.

When sufficient time has elapsed to insure the removal of all contaminants from the soil disposed in the container, the surplus water overlying the treated soil is withdrawn from the container by utilizing any conventional apparatus and the bacterial micro-organisms, chemicals, and water are retained in a holding tank to be used over again on the next batch. These recovery operations, accompanied by the recovery of the loosened hydrocarbons floating on the surface of the pool of the water in the manner described above, provides a substantial reduction in total costs of the remediation operation.

Most important, when all of the contaminated soil in an area is decontaminated by the method and apparatus of this invention, the container can be disassembled into panels and moved by ordinary highway trucks to the next site.

A complete appreciation of the invention and many of the advantages thereof will be perceived as the same becomes better understood by reference to the following detailed description when considered in connection with the following drawings:

BRIEF DESCRIPTION OF THE DRAWINGS

FIG. 5 is a schematic side elevational view of a float system for agitating the pool of water.

FIG. 7 is a top plan view of FIG. 5.

FIG. 8 is a schematic plan view of reinforcing cables traversing the wall and floor panels.

FIG. 9 is a front elevational view of the door of the container.

FIG. 10 is a perspective view of a typical nut, bolt, and pinion joint for side and bottom wall panels.

DETAILED DESCRIPTION OF THE PREFERRED EMBODIMENT

Figure 1:
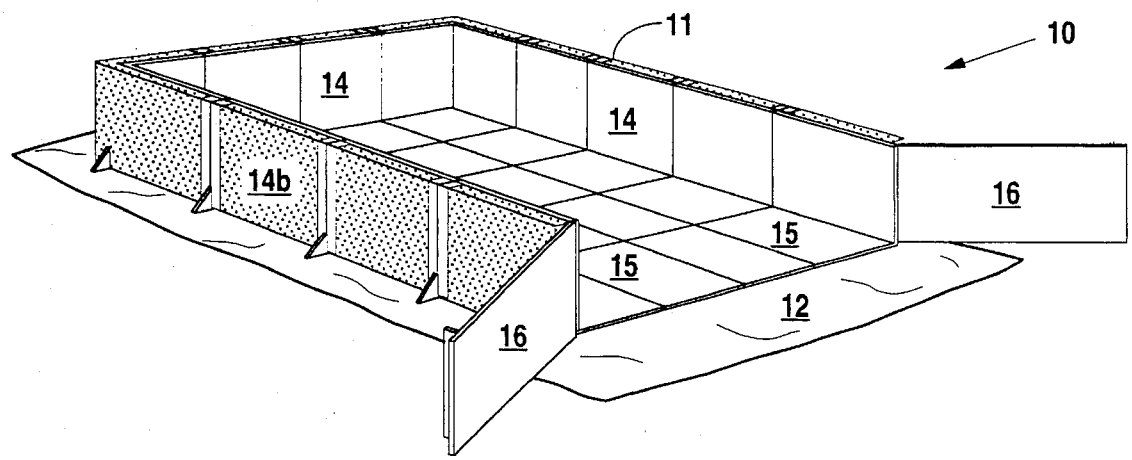
FIG. 1 illustrates a schematic, perspective view of the bio-remediation container embodying this invention prior to filling with contaminated soil.

The preferred embodiment of the present invention is a system for combining biological elements, chemical elements, mechanical apparatus and methods for bio-remediating soil, and the apparatus of the system is illustrated generally at 10 in the drawings as it would appear when assembled. To prevent any possible leakage from system 10 to its immediate surroundings at least a 10 mil thick sheet of plastic 12 is placed on the ground at the site location. Sand is than provided covering plastic sheet 12 to a depth of at least four (4) inches. Plastic sheet 12 with the added sand prevent any direct contact of the bottom surface of system 10 and the chosen site. Assembly of the system 10 on the sand and plastic sheet 12 begins with a plurality of substantially rectangular floor panels 15 each having at least one flat surface and preferable made of at least ⅛" steel sealably connected in a side by side relationship and overlying sheet 12. Those floor panels may, if desired, be constructed from flat metal plates rigidly affixed to a metal frame, or the plates and frame may, if desired, be made from any other convenient material suitable for the intended purpose of the present invention, such as wood, corrugated metal, fiber reinforced plastics, or the like. The flat surfaces of the floor panels 15 are upwardly facing. Those floor panels 15 have a rubber sealing gasket 13 inserted between adjoining members to sealably secure the floor members 15 when fully assembled. The floor panels 15 are affixed to at least 2×4 steel or 2×4 inch "L" angled beams (not shown) to provide the necessary support structure for those floor panels 15 to define a substantially rectangular floor for the system 10 that is strong enough to support 2 to 6 feet of contaminated soil and the weight of the transport vehicle 30.

The system 10 further comprises a plurality of substantially rectangular upstanding wall panels 14 each having at least one flat surface and at least one sealable end surface. In the preferred embodiment the wall panels are at least ⅛" steel plate having a rubber seal 13 inserted between the wall panels 14 in a sealably connected side by side relationship. The bottom edges of panels 14 are sealably engagable with the peripheral edges of the floor panels 15 for enclosing the container's floor on four sides, thereby deigning a four cornered container 11 capable of receiving at least 100 cubic yards of contaminated soil. Triangular braces 14a reinforce the bottom portions of wall panels 14.

The interconnection of the edges of the wall members adjacent to each other may, if desired, be abutting, pined, dovetailed, or tongued and grooved. The preferred embodiment for the present invention utilizes a guide pin 52 (FIG. 10) insertable into receiving hole 52a, guide pin 52 is secured at one end by retaining weld 52b. Pin 52 and receiving hole 52a combinations are spaced throughout wall panels 14, floor panels 15, and door 16 to provide the necessary aid to alignment in assembly of container 11. See FIG. 10.

The assembled floor panels 15 and wall panels 14 are preferably reinforced by stressed cables 56 (FIG. 8).

Figure 2:
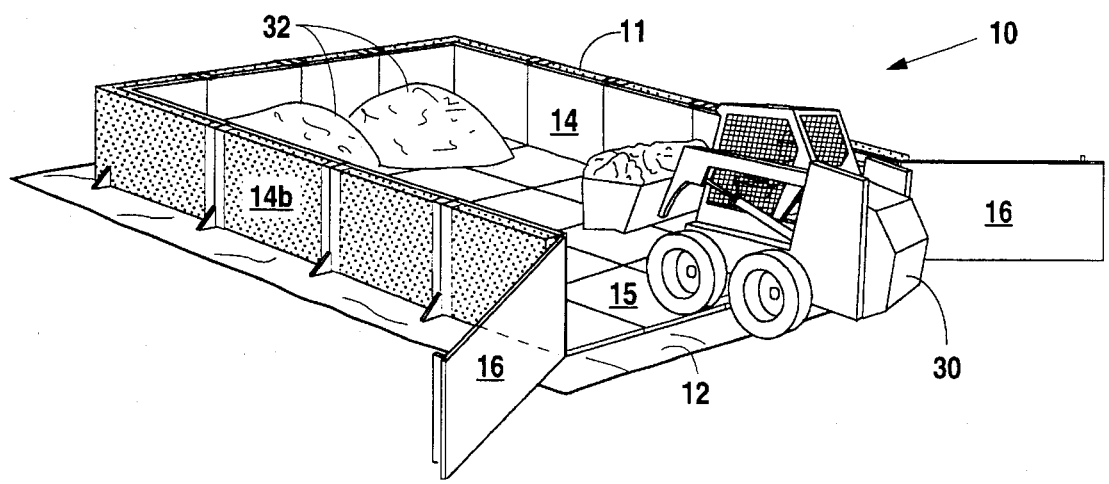
FIG. 2 illustrates the container of FIG. 1 being filled with the contaminated soil.
Figure 3:
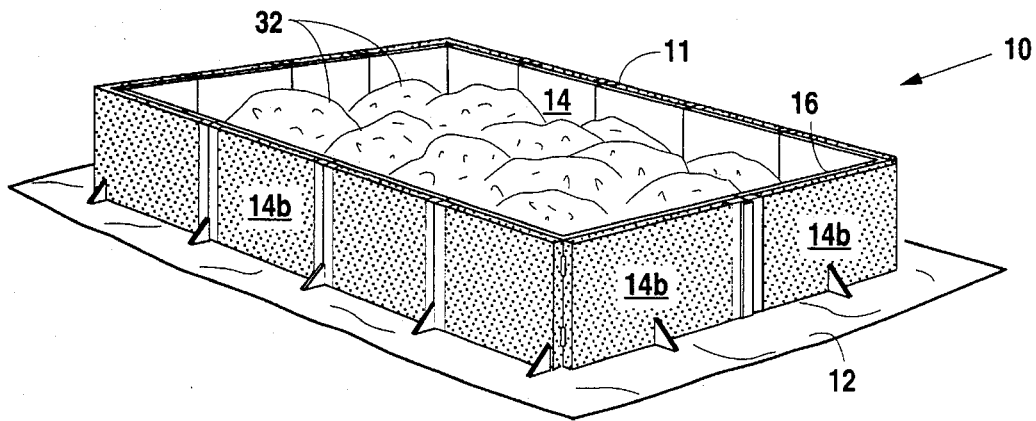
FIG. 3 illustrates the container of FIG. 1 after filling with contaminated soil and prior to remediation treatments.

Referring to FIGS. 1–3, one of the upstanding walls of container 11 defines at least one outwardly opening door 16 from one end of the container. Door 16 has a lateral width sufficient to provide for convenient entry of a large transport vehicle 30 (FIG. 2) for depositing the contaminated soil 32 within the container 11. The entry of the container 11 may, if desired be a single, double, or even rollup overhead door. The single or double doors that open outwardly may be also of the type that open downwardly to provide a ramp for vehicles. Suitable seals (not shown) effect the sealing of doors 16 when closed. FIG. 3 illustrates container 11 having deposited therein a quantity of contaminated soil 32 and closed doors 16a (sealably secured), containing all soil plus water to be added within container 11. If desired, plastic foam 14b may be added to the exterior faces of wall panels 14 for insulation in cold climates.

Figure 4:
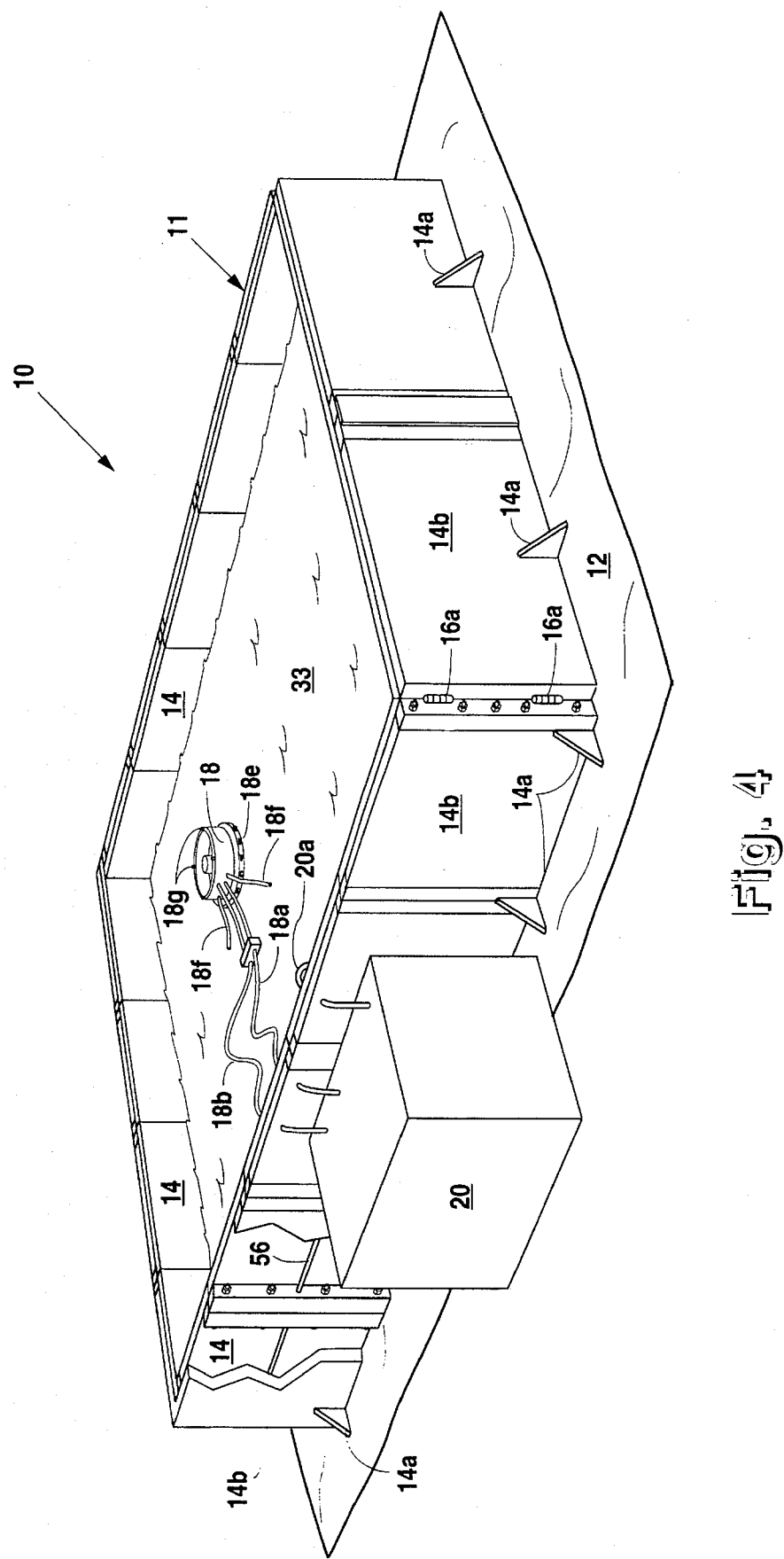
FIG. 4 comprises a schematic perspective view of one embodiment of the bio-remediation system for contaminated soil.

Referring to FIG. 4, system 10 is completed with a water supply (not shown) and a conventional heat exchanger, a water recirculating pump, air supply, retaining tank, and water cyclone filter that all are well known in the art and will be collectively referred to as an auxiliary unit 20. Unit 20 may, if desired, be trailer mounted as shown in FIG. 4C. Water is pumped into container 11 from auxiliary unit 20 with the appropriate chemicals and microbes to bio-remediate soil 32 already added, to produce a water pool 33 above soil 32 having a depth of one to two feet or more. After achieving the desired depth, the pool water is recirculated through the heat exchanger and the cyclone filter by the pump contained in auxiliary unit 20.

A buoyant float assembly 18 operatively connected to auxiliary unit 20 is disposed on the surface of water 33. Auxiliary unit 20 provides conventional apparatus for supplying pressurized air and recirculated pool water to float 18. Float 18 has a manifold 18c (FIG. 6) that receives pressurized water and air from auxiliary unit 20. Manifold 18c directs the water and air to a plurality of downwardly facing adjustable jets 18d. Those jets 18d are adjustable to provide a mixed flow of water and air at the rate of at least 50 gallons per minute. That high flow of pressurized water and air agitates and shears contaminated soil 32. The chemicals added to the water will break down soil 32 to extract hydrocarbon compounds from the contaminated soil 32. The hydrocarbon compounds will float to the surface of the water 33 and are skimmed off through a suction pump 18m located on float 18 to a tank within auxiliary unit 20 for further processing or for resale.

Assume that the hydrocarbon contaminated site is a tank farm for oil storage that has leaked oil into the soil over a period of years. The site is now desired to be remediated and returned to an uncontaminated. The oil contaminated soil is excavated and then deposited into container 11 by a front-end loader 30. Doors 16 are closed and sealed, the edges of plastic sheet 12 are layered around the exterior of container 11 isolating system 10 from the job site. Water 33, combined with the appropriate chemicals and microbes is added to system 10 until the volume of water to soil ratio is about 40% or about 15" of water above 3' of soil. Pressurized air and recirculated water is then supplied to float 18. Float 18 begins to agitate, aerate, and break apart the contaminated soil 30 until soil 30 is emulsified. Float 18 concurrently moves about the interior of the container 11 of system 10 without being monitored by any external source. Float 18 will continue its movement uninterrupted by any floating matter within the container by flexible hose air/water jets 18f (FIG. 7) extending outwardly from float 18.

The oil will begin to separate from the contaminated soil and float to the surface of the water 33. That oil will be siphoned off by a suction pump 18m (FIG. 6) mounted on float 18. That oil will than be pumped through hose 18b into a holding tank within auxiliary unit 20.

Figure 4A:
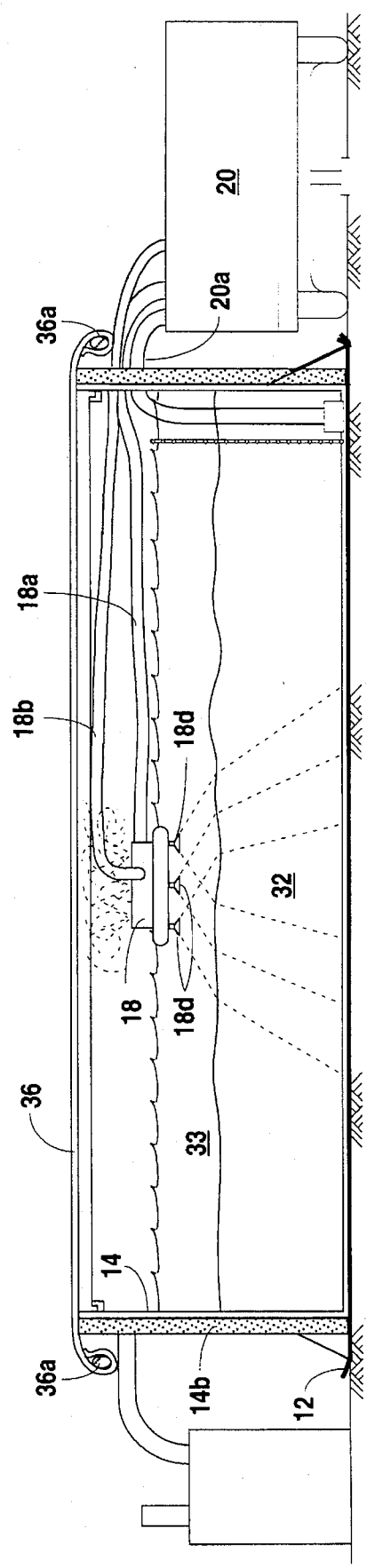
FIG. 4A is a schematic, vertical sectional view of FIG. 4 with a vapor trapping cover installed.

In the event the contaminated soil 32 contains volatiles or fumes that may be hazardous, a plastic cover 36 having weighted edges 36a, as schematically shown in FIG. 4A may be added to container 11 to prevent such fumes from escaping. Upwardly spraying water jets 18g (FIG. 6) are mounted on float 18 to receive pressurized recirculating water 33 from manifold 18c. The upwardly recirculated spraying water 33a will trap airborne vapors and return them to the pool of water 33 so that they may be absorbed by the microbes. FIG. 4A also illustrates sump pump 20a that is utilized to siphon water 33 from container 11. The total volume of water 33 delivered to container 11 by float 18 is equal to the total volume of water 33 siphoned from container 11 by sump pump 20a and skimmer 18m.

Figure 4B:
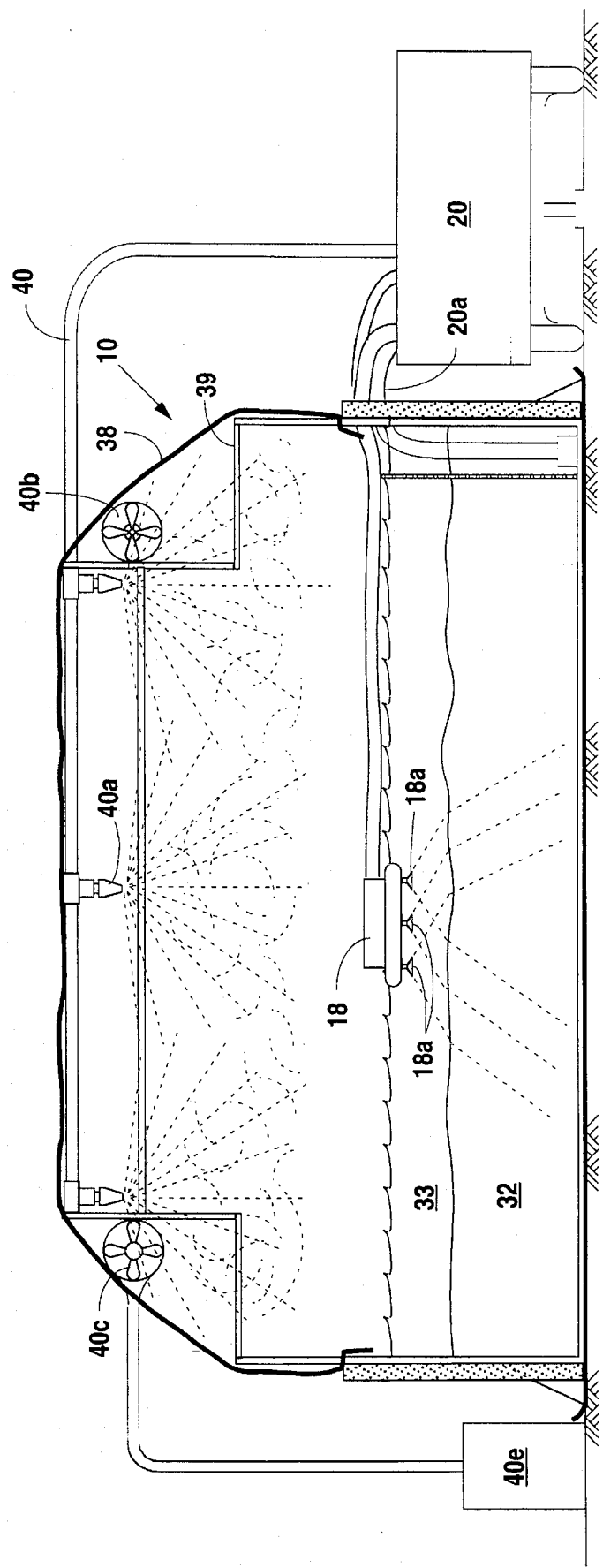
FIG. 4B is an end view of the structure of FIG. 4 with an elevated roof and toxic fume removal system.
Figure 4C:
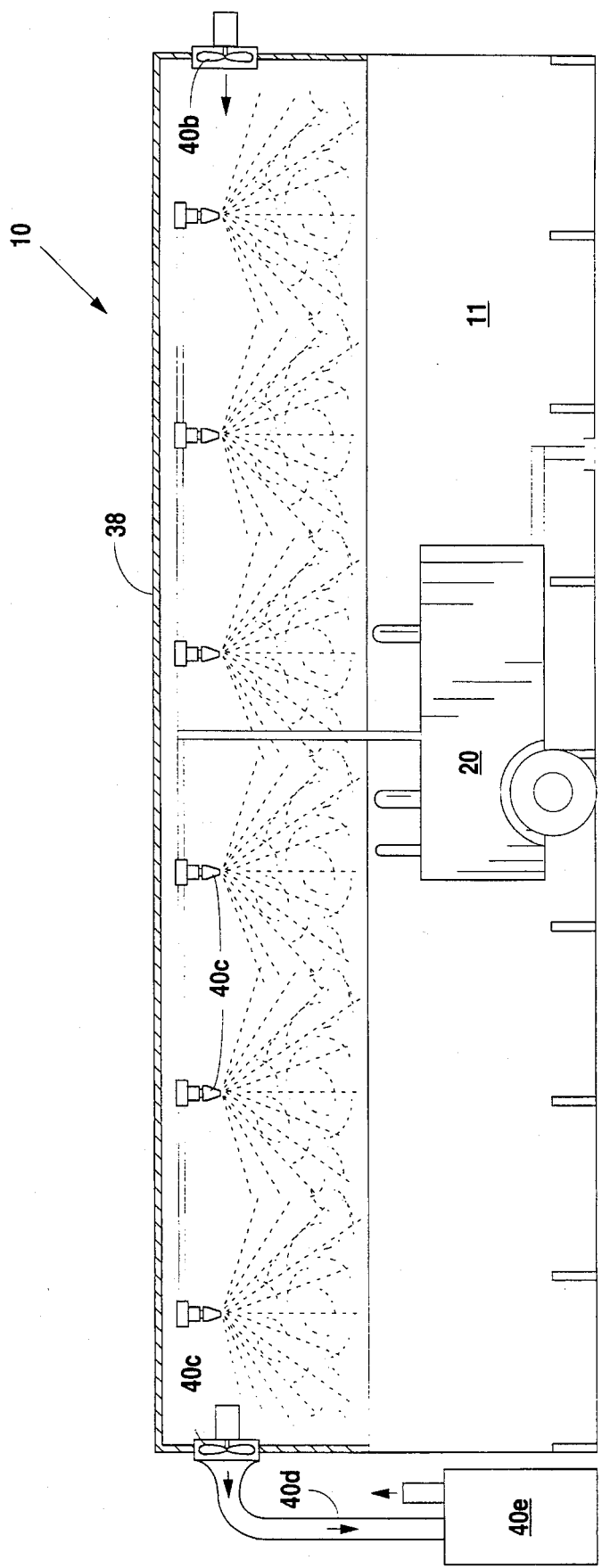
FIG. 4C is a schematic side elevational view of FIG. 4B.

FIG. 4B illustrates system 10 with an elevated plastic cover 38 that may be added to system 10 if desired. Cover 38 is supported on frame 39 which mounts a separate spray system 40, comprising a plurality of spraying heads 40a that provide a fine mist of water above the surface of the pool of water 33. This mist will trap fumes and colloidal size particles and return such to the surface of the pool of water 33. Fumes are also removed by a flow of air above and across the mist spray of sprayheads 40a. That flow is provided by intake fan 40b and exhaust fan 40c.

FIG. 4C illustrates a side view of system 10 with a carbon filter air scrubber 40e attached to duct 40d which connects to exhaust fan 40c. Air intake fan 40b provides air movement across the upper portion of the interior of system 10. Exhaust fan 40c provides air flow from the interior of system 10 to the air scrubber 40e. Air scrubber 40e will remove any hazardous fumes or volatiles from the air and then release the cleaner air into the surrounding environment.

Figure 6:
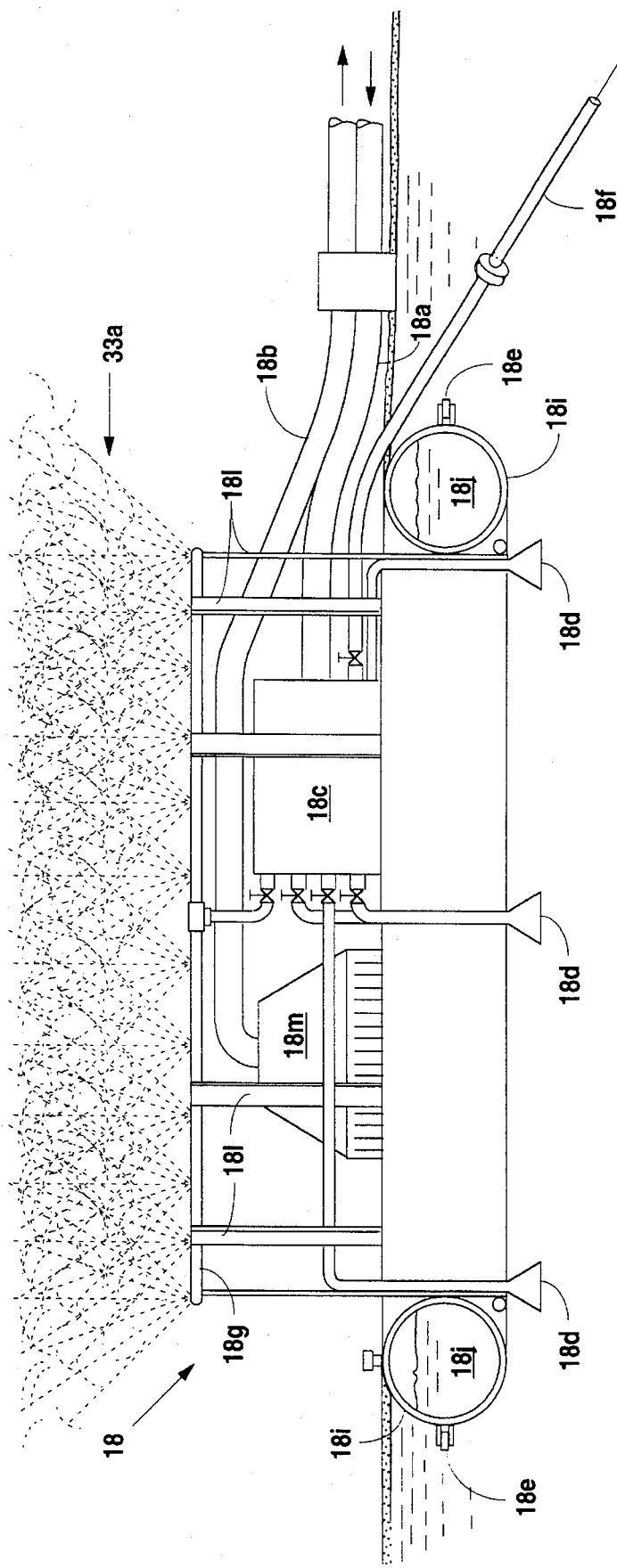
FIG. 6 is a enlarged scale side elevational view, partly in section, of the float system for agitating the water pool.

FIG. 6 illustrates a cross-sectional view of float 18. A torus shaped buoyant member 18i is partially filled with liquid 18j to lower or raise float 18 in container 11 when the bottom of float 18 is in contact with pool water 33. That liquid 18j may be water, oil, or a liquid of a density to allow float 18 to be buoyant in any chosen media for bio-remediation. In the preferred embodiment that liquid is water. A plurality of rollers 18e are disposed around the periphery of buoyant member 18i to cooperate with lateral flexible hose air/water jets 18f allowing float 18 to move freely throughout container 11 without becoming wedged or trapped in a fixed location.

FIG. 7 illustrates the top of float 18 showing the manifold 18c for supplying air and water to jets 18g. Those jets may, if desired, be manually turned on for continuous water spray or turned off for no water spray. Vertical support members 18l attach to float 18 and provide support for manifold 18c and sprayers 18g.

The method of assembly of system 10 is best understood by viewing FIG. 8 in conjunction with FIG. 9, shown without foam 14b and FIG. 10. A plurality of floor panels 15 are assembled in a side by side relationship on top of the sand (not shown) residing on plastic sheet 12.

Each side panel 14 and floor panel 15 has a plurality of pins 52 extending along one mating edge and a plurality of receiving holes 52a along the other mating edge of the panel. The mating edges of wall panels 14 and floor panels 15 are secured to each other by bolts 54 and nuts 54a, as shown in FIG. 10. A rubber sealing casket 13 is inserted between joining floor and wall panels providing a liquid impermeable seal. A sealing tape (not shown) is placed over all joining edges further providing a seal that will prevent any liquid from leaking out of system 10 into the surrounding environment. A plurality of bolts 54 and nuts 54a similarly secure and seal the two doors 16 to each other and to the floor panel 15 and the door hinges 16a.

Whenever the container 11 is to be employed in an area where the ambient temperatures fall below 70° F., it is highly desirable to heat the recirculating pool water by the heat exchanger incorporated in auxiliary unit 20 so as to maintain the pool water preferably at or about 92° F. At this temperature, the propagation of the microbes is at a maximum and can well justify the extra cost of heating the recirculating pool water by a substantial reduction in the time required to remediate the contaminated soil.

In a particular embodiment of this invention, the chemical composition to be inserted into the pool water may comprise at least one wetting agent (1–7% by volume of the chemical composition) and a combination of salts (4–6 lbs of salts per gallon of the chemical composition) selected from the group consisting of ammonium surfate, ammonium nitrate, ammonium chloride and calcium chloride.

In another embodiment of this invention, the chemicals composition to be inserted into the pool water may also comprise a strong acid (5–12% by volume of the chemical composition), such as phosphoric acid or surfuric acid.

In yet another embodiment of this invention, the wetting agent used in the chemical composition may comprise at least one of dodecylbenzene sulfonic acid, a fatty amidephosphate ester salt, and monoisopropylamine dodecyl benzene sulfonate.

In still another embodiment of this invention, an aqueous solution of ammonium, calcium and phosphate (1–10% by volume of the chemical composition) and/or a solution of humic acid (½–1% by volume of the chemicals) may also be a part of the chemical composition as nutrients for the microbiological agents. These act as nutrients for the microbiological agents as well as chelators for the metals present in the soil.

In another embodiment of this invention, terpene or limonene (up to 100% of the volume of the chemical composition already inserted into the pool of water) may be added separately to the pool of water into which the chemical composition has already been inserted. Terpene and limonene enhance the effect of the chemical composition on tars and paraffin and asphaltene compounds trapped in the soil.

In yet another embodiment of this invention, an additional amount of an aqueous solution of ammonium, calcium and phosphate (up to 100% of the volume of chemical composition already inserted into the pool of water) may be added separately to the pool of water into which the chemical composition has already been inserted. This solution gives additional nutrients for the microbiological agents as well as acting as a chelator for the metals present in the soil.

In still another embodiment of this invention, an additional amount of monoisopropylamine dodecyl benzene sulfonate (up to 100% of the volume of the chemical composition already inserted into the pool of water) may be added separately to the pool of water into which the chemical composition has already been inserted. This increases the effectiveness of the chemical composition in breaking down particularly clayey soil and enhances the effect of the chemical composition on tars and asphaltene compounds trapped in the soil.

In another embodiment of this invention, an additional amount of phosphoric acid or sulfuric acid (up to 0.001% of the volume of the pool of water) may be added separately to the pool of water into which the chemical composition have been inserted. This is necessary to lower the pH to the range of 5.5–6.5, at which range the microbiological agents work most efficiently.

In a preferred embodiment of the invention, the total volume percentage amount of the chemical composition in the pool of water should be in the range of 0.032–0.056% in order to both preserve the effectiveness of the chemical composition to break down and release the hydrocarbons entrapped in the soil and to enhance the growth of the microbes.

The microbiological agents employed in practicing the method of this invention may be those available from a number of suppliers, such as E. R. I., Oppenheimer, Tesoro, and Koseki.

The microbiological agents used may comprise anaerobic, aerobic and facultative bacteria. Any of the biological treatment agents listed in the aforementioned Smith patent (U.S. Pat. No. 5,039,415) may be utilized, which include Achromobacter, Arthobacter, Aspergillus, Bacillus, Candida, Cladosporium, Corynebacterium, Myrothecium, Nocardia, Punicillium, Phialophora, Pseudomonas, Rhodotorula, Streptomyces, Trichoderma, and a blend of anaerobic and facultative organisms. The selection of the most appropriate microbes depends, of course, on the nature of the contamination.

All of the foregoing chemicals and microbiological agents are biodegradable and, to the extent that they are left over in the soil after the bioremediation process is completed, they actually act as fertilizing agents to promote the growth of plant life in the soil.

EXAMPLES

Example 1: The Chemical Composition

A 55 gallon batch of one embodiment (PS 45) of the chemical composition according to the present invention was prepared by mixing the following ingredients:

100 pounds of ammonium sulfate;

150 pounds of ammonium nitrate;

25 pounds of calcium chloride (74–89% calcium);

5 gallons of phosphoric acid (74%, pH 1.3);

one half gallon (4 pounds) of soft dodecyl benzene sulfonic acid (DDBSA) (C-90 manufactured by Pilot Chemical);

16 fluid ounces (1 pound) of a fatty amide-phosphate ester salt (Amidex 1248 manufactured by Chemron) and 1 gallon (8 pounds) of monoisopropyl amine dodecyl benzene sulfonate (PRS manufactured by Pilot Chemical).

The above mixture was dissolved in approximately 33 gallons of water to make a total of 55 gallons of composition.

Example 2: Another Embodiment of the Chemical Composition

A 55 gallon batch of another specific embodiment (PS 43) of the chemical composition according to the present invention was prepared by mixing the following ingredients:

150 lbs. ammonium surfate (21-0-0);

100 lbs. ammonium nitrate (34-0-0);

25 lbs. ammonium chloride (20-0-0);

One half gallon (4 pounds) of monoisopropyl amine dodecyl sulfonate (PRS manufactured by Pilot);

16 fluid ounces (1 pound) of a fatty amide-phosphate ester salt (Amidex 1248 manufactured by Chemron).

The above mixture was dissolved in approximately 33 gallons of water to make 55 gallons.

Example 3: Another Embodiment of the Chemical Composition

Another specific embodiment (PS98) of the chemical composition according to the present invention was prepared by adding 4 gallons phosphoric acid to a 55 gallon batch of the mixture of Example 2 (PS 43).

Example 4: Another Embodiment of the Chemical Composition

Another specific embodiment (PS 42) of the chemical composition according to the present invention was prepared according to the procedure described in Example 2 except that 250 lbs instead of 100 lbs. of ammonium nitrate was added and no ammonium sulfate was added.

Example 5: Treatment of Hydrocarbon Contaminated Soil

The soil to be treated was tested to determine the type of soil, the type of contaminants and the percentage amount of contaminants in the soil.

5 gallons of the composition of Example 4 (PS 42) were mixed together with 1200 gallons of water. To this mixture was added one and one quarter gallons of phosphoric acid (approximately 0.1% by volume) to lower the pH of the mixture to 5.5–6.5. One gallon of PRS and 5 gallons of terpene were added to the composition because the soil contaminants were high in tar and asphaltenes. As a source of nutrients for the microbes and as a chelator for metals which may otherwise poison the microbes, 5 gallons of an aqueous solution of ammonium, calcium and phosphate (4% by weight of $NH_4$, 11% by weight of Ca and 11% by weight of $P_2O_5$ known as 4-11-11) was added as well as one haft gallon of humic acid (Enhance ® THA manufactured by Western Nutrients Corporation).

The container of the present invention was loaded with soil approximately three feet deep.

The above aqueous solution was applied by high pressure spray onto the top of the soil in the container to form a water blanket. The high pressure spraying of the solution onto the soil had a shearing action on the soil which caused the clayey soil to break down into a super-saturated slurry. The soil was wetted to the small particle level which liberated the contaminants into the water blanket. All oils which traveled to the surface of the water blanket were siphoned off. Within two days, approximately 90% of the oils contaminating the soil had risen to the surface and been siphoned off After two days of pressurizing the soil with water, chemicals and siphoning, no more oil appeared on the surface of the water blanket.

After all oil had been siphoned from the surface of the water blanket, a solution of microbes was added to the soil in the amount of 1 pound of microbes per 10 square yards of soil surface. The microbes, before being mixed into solution, were at a concentration of 23 billion bacteria per gram count, of which amount 40% of the bacteria were anaerobic, 40% were aerobic and 20% were facultative. Before being applied to the soil, the microbes were added to the water pool. At this point, an aqueous solution of ammonium, calcium and phosphate (4% N, 11% CaO and 11% $P_2O_5$ known as 4-11-11) was also added to the microbe solution to 0.05% by weight as a nutrient for the bacteria. Humic acid (Enhance ® THA manufactured by Western Nutrients Corporation) was also added to the solution to 0.01% by weight. The aqueous solution of ammonium, calcium and phosphate serve as nutrients for the bacteria and as chelating agents to promote multiplication of the bacteria.

The water pool, which now contained the microbes, was then mixed with pure oxygen gas and pumped by high pressure into the slurry soil where the microbes proceeded to break down the 10% of hydrocarbon contaminants remaining in the slurry soil and the water blanket.

In order to speed up the microbes' breakdown of the contaminants and also to help the microbes grow, the soil slurry and water blanket were maintained at a temperature of 90°–95° F.

When the water cleared, the water and soil were tested for contaminants. The process was finished when the tests showed that the contaminants were below the allowable levels.

The water in the water blanket was then pumped into another container for reuse and the soil was removed to a designated area. The container was then refilled with contaminated soil and the process started over again.

Example 6: Laboratory Tests Results

Approximately 5 grams of a BTEX (benzene, toluene, ethylbenzene, xylene) contaminated soil was added to both a beaker containing 40 ml of warm water +1 ml PS98 (as described in Example 3 above) and another with 40 ml warm water+1 ml Alconox soap (to serve as a control). Both mixtures were stirred and filtered. Both filtered soils were rinsed with 10 ml water and allowed to air dry for approximately one hour before being stored in a refrigerator in separate glass jars. The Alconox control soil broke during storage so much of the BTEX in the control evaporated off before it could be tested. Therefore, the BTEX numbers for the control soil are much lower than would be expected but still higher than the BTEX numbers for the PS98 treated soil. The PS98 effluent was also stored in a 40 ml VOA vial for later BTEX analysis. The BTEX tests were conducted according to EPA *Test Methods for Evaluating Solid Waste*, SW-846, 3rd Edition, November, 1986. Analytical methods were: BTEX in Soil or Water 5030/8020; TPH in Water 418.1; TPH in Soil MODIFIED 8015 (GC/FID). The BTEX tests gave the following results shown in Table I:

TABLE I

|  | Benzene (ppb) | Toluene (ppb) | Ethyl-benzene (ppb) | Xylene (ppb) | Total BTEX (ppb) | TPH (ppm) |
| --- | --- | --- | --- | --- | --- | --- |
| Soil before treatment | 302 | 712 | 54 | 86 | 1154 | 1189 |
| Method blank for untreated soil | <10 | <10 | <10 | <10 | <10 | <5 |
| Matrix spike recovery for untreated soil | 101% | 86% | 46% | 45% | N/A | — |
| IS98 treated soil | 29 | 43 | <10 | 10 | 82 | — |
| Alconox treated soil (control) | <10 | 27 | 67 | 45 | 139 | — |
| PS98 treated soil effluent | 4 | 5 | 10 | 6 | 25 | — |
| Method blank for treated soil | <10 | <10 | <10 | <10 | <10 | <5 |
| Matrix spike recovery for treated soil | 126% | 75% | 69% | 68% | N/A | 109% |

From the foregoing description it will be readily apparent to those skilled in the art that large batches of the contaminated soil may be treated at any location by assembly at such location of the container 11 and the other elements of the system 10. Large earth moving units can be employed to bring contaminated soil within the container 11 and, due to the utilization of a pool of water containing chemicals and microbes, the entire batch may be efficiently and remediated with a minimum expenditure of time. In fact, the size of the batch does not automatically increase the time of remediation, since the container 11 will be larger and can contain a larger quantity of water carrying the treatment chemicals and microbes. The recovery of hydrocarbons rising to the surface of the pool of water is a unique economic advantage of the system. Additionally, the fact that used the recirculated water may be transferred to a tank truck when the remediation activities at one site is completed greatly adds to the economy of the entire system.

To move to a new location, the panels forming the container 11 are unfastened and loaded on to ordinary highway trucks, as is all of the other apparatus heretofore described, such as the auxiliary unit 20. No permanent structures are required to be erected and the actual site of the container 11 is protected from contamination due to the fact that the container 11 is mounted upon the plastic sheet 12.

The invention now being described, it will be apparent to one of ordinary skill in the art that many changes and modifications can be made thereto without departing from the spirit or scope of the invention set forth in the appended claims.

I claim:

1. A portable sectional container for remediating soil contaminated by organic compounds, comprising:

a plurality of substantially rectangular floor members each having at least one flat surface, said floor members being sealably connected in side by side relationship and with said flat surface upwardly facing, thereby defining the floor of said container;

a plurality of substantially rectangular upstanding wall members each having at least one flat surface and at least one sealable end surface, said wall members being sealably connected in side by side relationship, and having their bottom edges sealably engagable with the peripheral edges of said floor members for enclosing said container's floor on four sides, thereby defining a four cornered container capable of receiving at least 50 cubic yards of said contaminated soil therein;

a door assembly sealably closeable, and mounted in one of said upstanding wall members for entry into the interior of the container;

said door assembly opening outwardly from said one upstanding wall member;

said door assembly extending laterally in width, sufficient to provide for entry of transport vehicles for said contaminated material;

said door assembly, when closed, preventing liquid leakage from said container, thereby permitting said container to be filled with water containing remediation materials to a depth covering said contaminated soil;

means for adding water containing remediation materials to said container to form a pool having a depth sufficient to cover a layer of contaminated soil inserted in the container;

means for recirculating said water containing remediation materials into and out of said container; and a plurality of water spraying nozzles to discharge pressurized recycled water downwardly to agitate and shear said contaminated soil in said container.

2. The portable, sectional container of claim 1 further comprising:

a first plurality of vertically spaced cables adjacent said wall members and connecting opposite corners of said container;

means for imparting horizontal pre-stressing to said wall members by tightening said first cables;

a second plurality of spaced horizontal and vertical cables connecting opposite edges of said floor;

means for imparting pre-stressing to said floor members by tightening said second cables; and whereby said wall and floor members are secured against forces produced by the mass of said soil and water deposited within the container.

3. A portable sectional container as recited in claim 1, further comprising:

a plurality of pilot pins positioned along one vertical edge of each said upstanding wall member and along one horizontal edge of each said floor member;

said wall members' other vertical edge and said floor members' other horizontal edge, having a plurality of holes for receiving said opposing wall and floor members' pilot pins;

whereby said wall and floor members are pinionly interlocked.

4. A portable sectional container as recited in claim 1, further comprising:
   a liquid impermeable, elongated sealing member disposed between each said upstanding wall members' vertical edge for sealably joining said wall members; and
   a second liquid impermeable, elongated sealing member disposed between and adjacent edges of said floor members for sealably joining said floor members.

5. A portable sectional container as recited in claim 1 wherein said upstanding wall members each having along their respective vertical sides, one half of a joint for sealably joining said plurality of upstanding wall members in side to side relation.

6. A portable sectional container as recited in claim 1 wherein said floor members each having along their respective horizontal sides, one half of a joint for sealably joining said plurality of floor members side to side.

7. The portable, sectional container of claim 1 further comprising means for incorporating air with said pressurized recirculated water to aerate said contaminated soil.

8. A portable sectional container as recited in claim 1, further comprising a water buoyant member freely floating on the surface of said pool;
   a manifold mounted within said buoyant member and having an intake port connected to said recirculation means;
   said manifold having a plurality of downwardly directed spray nozzles to agitate said water and said contaminated soil in the container, thereby causing separation of organic compounds from said contaminated soil to rise to the surface of said water in the container; and
   skimmer means mounted on said buoyant member to remove said separated organic compounds from the water surface.

9. A portable sectional container as recited in claim 1, wherein said floor, wall, and door members are transportable by a highway truck.

* * * * *